United States Patent Office 3,236,836
Patented Feb. 22, 1966

3,236,836
3-SUBSTITUTED 1-(3-AZABICYCLO[3.2.2]NON-3-YL) ALKYL-2-THIOUREAS
Peter Yonan, Chicago, Ill., assignor to G. D. Searle & Co., Chicago, Ill., a corporation of Delaware
No Drawing. Filed July 17, 1963, Ser. No. 295,844
9 Claims. (Cl. 260—239)

The present invention relates to a group of substituted thioureas which contain the 3-azabicyclo[3.2.2]nonane structure. More particularly, it relates to compounds of the following general formula

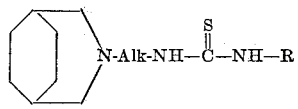

wherein Alk is a lower alkylene radical and R is selected from the group consisting of lower alkyl, lower alkenyl, phenyl, and benzyl.

The lower alkylene radicals referred to above contain up to six carbon atoms and can be exemplified by radicals such as ethylene, trimethylene, tetramethylene, pentamethylene, and hexamethylene. The lower alkyl radicals referred to above contain up to six carbon atoms and are exemplified by radicals such as methyl, ethyl, propyl, and butyl. Similarly, the lower alkenyl radicals contain up to six carbon atoms and they are exemplified by radicals such as allyl and 2-butenyl.

Also encompassed by this invention are the non-toxic salts of the aforementioned organic bases, as exemplified by the hydrochloride, hydrobromide, hydroiodide, tartrate, succinate, malate, acetate, citrate, ascorbate, nitrate, sulfate, phosphate, and sulfamate.

The compounds of the present invention are conveniently prepared by reacting the appropriate isothiocyanate with a 3-aminoalkyl-3-azabicyclo[3.2.2]nonane. An inert material such as anhydrous ether can be used as a solvent for carrying out the reaction.

The intermediate 3-aminoalkyl-3-azabicyclo[3.2.2]nonanes referred to above are conveniently obtained by reduction of the appropriate 3 - cyanoalkyl - 3 - azabicyclo-[3.2.2]nonane. Lithium aluminum hydride is a useful reagent for this reduction.

The compounds of this invention possess valuable pharmacological properties. In particular, they are anti-inflammatory agents and this is demonstrated by their phenylbutazone-like effect on edematous conditions. In addition, they are hypocholesterolemic agents. Furthermore they are anti-bacterial and anti-algal agents as demonstrated by their inhibition of the growth of the organisms *Diplococcus pneumoniae* and *Chlorella vulgaris* and they inhibit germination of seeds of trifolium.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degrees centigrade (° C.).

Example 1

To a solution of 50 parts of 3-azabicyclo[3.2.2]nonane in 120 parts of tert-butanol is added portionwise 21.2 parts of acrylonitrile. The resultant mixture is then stirred at room temperature for six hours. The solvent is evaporated and the residue is distilled under reduced pressure to give 3 - (2 - cyanoethyl) - 3-azabicyclo[3.2.2]nonane.

To a mixture of 75.5 parts of chloroacetonitrile and 53 parts of sodium carbonate in dry benzene there is added portionwise a solution of 125 parts of 3-azabicyclo[3.2.2]nonane in 175 parts of dry benzene. The resultant mixture is refluxed for four hours and then cooled, filtered, and distilled to give 3-cyanomethyl-3-azabicyclo[3.2.2]nonane.

Example 2

A suspension of 28.5 parts of lithium aluminum hydride in 710 parts of ether is prepared, and 82 parts of 3-cyanomethyl-3-azabicyclo[3.2.2]nonane is added portionwise. The resultant mixture is refluxed for three hours and then allowed to stand for fifteen hours. Water is then cautiously added dropwise to the mixture to decompose excess lithium aluminum hydride. The resultant mixture is filtered and the solid is washed with ether. The filtrate and the washings are combined, the solvent is removed, and the residue is distilled to give 3-(2-aminoethyl)-3-azabicyclo[3.2.2]nonane.

In a similar manner, 3 - (2 - cyanoethyl)-3-azabicyclo[3.2.2]nonane is reduced with lithium aluminum hydride to give 3 - (3 - aminopropyl) - 3 - azabicyclo[3.2.2]nonane.

Example 3

A solution of 2 parts of ethyl isothiocyanate in 7 parts of anhydrous ether is added portionwise to a stirred solution of 2.5 parts of 3-(2-aminoethyl)-3-azabicyclo[3.2.2]nonane in 14 parts of anhydrous ether. The resultant solution is concentrated and hexane is added. This causes it to crystallize. The resultant product, 1-[2-(3-azabicyclo[3.2.2]non-3-yl)ethyl]-3-ethyl-2-thiourea, melts at about 70–71° C. and it has the following formula

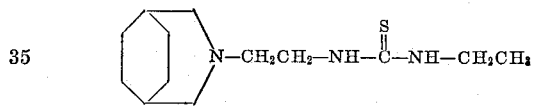

An equivalent quantity of methyl isothiocyanate is substituted for the ethyl isothiocyanate and the above procedure is repeated. The product is 1 - [2 - (3-azabicyclo-[3.2.2]non-3-yl)ethyl]-3-methyl - 2 - thiourea melting at about 98.5–99.0° C.

Example 4

An equivalent quantity of phenyl isothiocyanate is substituted for the ethyl isothiocyanate and the procedure of Example 3 is repeated. The product is 1-[2-(3-azabicyclo[3.2.2]non-3-yl)ethyl]-3-phenyl-2 - thiourea melting at about 143–144° C.

Example 5

2.6 parts of n-butyl isothiocyanate is reacted with 2.5 parts of 3-(2-aminoethyl)-3-azabicyclo[3.2.2]nonane according to the procedure described in Example 3. In this case the crude concentrated reaction mixture is dissolved in 2-propanol and a solution of excess hydrogen chloride in 2-propanol is added. The resultant mixture is then diluted with anhydrous ether and the hydrochloride salt precipitates. The solid is separated and recrystallized from a mixture of ethanol and ether to give 1-[2-(3-azabicyclo[3.2.2]non-3-yl)ethyl-3-butyl-2-thiourea hydrochloride melting about 115–116° C.

In a similar manner, allyl isothiocyanate and crotyl isothiocyanate are reacted with 3-(2-aminoethyl)-3-azabicyclo[3.2.2]nonane and the product is isolated from the reaction mixture. The products obtained are, respectively, 1 - [2-(3-azabicyclo[3,2,2]non-3-yl)ethyl]-3-allyl-2-thiourea hydrochloride melting at about 147–148° C. and 1 - [2-(3-azabicyclo]3,2,2]non-3-yl)ethyl]-3-crotyl-2-thiourea hydrochloride.

Example 6

A solution of 3.5 parts of ethyl isothiocyanate in 21 parts of anhydrous ether is added portionwise to a stirred solution of 6 parts of 3-(3-aminopropyl)-3-azabicyclo[3.2.2]nonane in 42 parts of anhydrous ether. The solvent is removed and the resultant residue is dissolved in 2-propanol. A solution of excess hydrogen chloride in 2-propanol is then added and the resultant solution is diluted with anhydrous ether. This causes crystals to form. The solid is separated and recrystallized from a mixture of ethanol and ether to give 1-[3-(3-azabicyclo-[3.2.2]non-3-yl)propyl]-3-ethyl-2-thiourea hydrochloride melting at about 180–181° C. The free base of this compound has the following formula

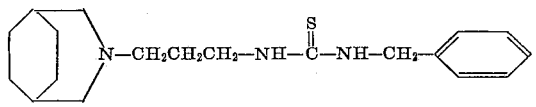

Example 7

If 4.5 parts of butyl isothiocyanate is substituted for the 3.5 parts ethyl isothiocyanate and the procedure of Example 6 is repeated, the product is 1-[3-(3-azabicyclo-[3.2.2]non-3-yl)propyl]-3-butyl-2-thiourea hydrochloride melting at about 155–156° C.

In a similar manner, if an equivalent quantity of benzyl isothiocyanate is substituted for the ethyl isothiocyanate and the procedure of Example 6 is repeated, the product is 1 - [3-(3-azabicyclo[3.2.2]non-3-yl)propyl]-3-benzyl-2-thiourea hydrochloride melting at about 184–186° C. The free base of this compound has the following formula

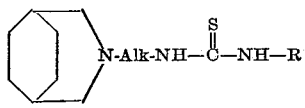

What is claimed is:
1. A compound of the formula

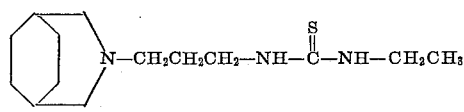

wherein Alk is lower alkylene separating the nitrogens attached thereto by at least two carbon atoms, and R is selected from the group consisting of lower alkyl, lower alkenyl, phenyl, and benzyl.

2. A compound of the formula

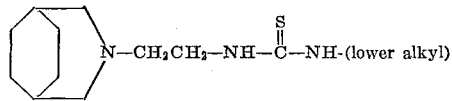

3. 1 - [2-(3-azabicyclo[3,2,2]non-3-yl)ethyl]-3-methyl-2-thiourea.
4. 1 - [2 - (3-azabicyclo[3.2.2]non-3-yl)ethyl]-3-ethyl-2-thiourea.
5. A compound of the formula

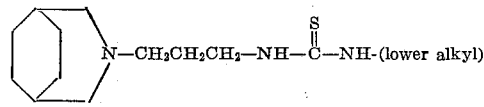

6. 1 - [3-(3-azabicyclo[3.2.2]non-3-yl)propyl]-3-ethyl-2-thiourea.
7. 1 - [3-(3-azabicyclo[3.2.2]non-3-yl)propyl]-3-butyl-2-thiourea.
8. 1 - [2-(3-azabicyclo[3.2.2]non-3-yl)ethyl]-3-phenyl-2-thiourea.
9. 1 - [3 - (3-azabicyclo[3.2.2]non-3-yl)propyl]3-benzyl-2-thiourea.

References Cited by the Examiner
UNITED STATES PATENTS 3,078,272  2/1963  Mull _____ 260—239

OTHER REFERENCES

Jansco: J. Pharm. Pharmacol., vol. 13, pages 577–594 (1961).

Meli et al.: Proc. Soc. Exp. Biol. Med., vol. 117, pages 34–38 (1964).

NICHOLAS S. RIZZO, *Primary Examiner.*

JOHN D. RANDOLPH, *Examiner.*